US006954640B2

(12) United States Patent
Radpour

(10) Patent No.: US 6,954,640 B2
(45) Date of Patent: Oct. 11, 2005

(54) GLOBAL ROAMING SERVICES FOR TELECOMMUNICATIONS SYSTEMS

(75) Inventor: Assad Radpour, Austin, TX (US)

(73) Assignee: SBC Properties, L.P., Reno, NV (US)

( * ) Notice: Subject to any disclaimer, the term of this patent is extended or adjusted under 35 U.S.C. 154(b) by 370 days.

(21) Appl. No.: 10/248,773

(22) Filed: Feb. 17, 2003

(65) Prior Publication Data

US 2004/0176074 A1 Sep. 9, 2004

(51) Int. Cl.[7] .............................................. H04Q 7/20
(52) U.S. Cl. ..................... 455/431; 455/414.1; 455/445
(58) Field of Search ............................. 455/431, 435.1, 455/433

(56) References Cited

U.S. PATENT DOCUMENTS

| | | | |
|---|---|---|---|
| 6,002,929 A | 12/1999 | Bishop, Jr. et al. | |
| 6,052,604 A | 4/2000 | Bishop, Jr. et al. | |
| 6,233,449 B1 * | 5/2001 | Glitho et al. | 455/423 |
| 6,321,084 B1 * | 11/2001 | Horrer | 455/431 |
| 2001/0016825 A1 | 8/2001 | Pugliese, III et al. | |
| 2002/0006792 A1 | 1/2002 | Usher et al. | |
| 2002/0010633 A1 | 1/2002 | Brotherston | |

* cited by examiner

Primary Examiner—Creighton Smith

(57) ABSTRACT

A system and method for extending a user's communications services to an airplane seat telephone terminal proximate the user while the user is aboard an airplane is provided. The system includes a Subscriber Interface (SI) for providing a Subscriber Identity Record (SIR) including the user's flight data and a Universal Communications Address (UCA), and a Subscriber Location Register (SLR) adapted to receive the subscriber identity record from the subscriber interface and communicate with a home location register associated with the user to provide a subscriber location in response to a telephone call placed to the user's Universal Communications Address. The Universal Communications Address can be a Mobile Station ISDN number associated with a wireless user terminal or an ISDN/PSTN number associated with a wireline telephone of said user.

17 Claims, 14 Drawing Sheets

GLOBAL ROAMING SERVICES FOR TELECOMMUNICATIONS SYSTEMS

BACKGROUND OF INVENTION

The present invention relates generally to telecommunications systems and, more particularly, concerns a global roaming service for telecommunications systems which permits extension of wireless services to a user anywhere including on-board an airplane.

Numerous schemes exist for permitting land-based mobile telephone roaming services. Today, through agreements between network operators, a user can place and receive telephone calls through their wireless telephone anywhere within the country and, in some cases, anywhere worldwide. When traveling from place to place on-board an aircraft, however, a wireless telephone user has very limited options for making or receiving telephone calls. For example, many airline operators prohibit the use of cellular telephones in-flight because of the perceived potential for interference with the aircraft's electronic systems. Moreover, there are technical difficulties in using a standard cellular telephone while in-flight. Specifically, the mobile unit could establish a line-of-sight to a large number of base stations simultaneously and cause problems with base station frequency re-use patterns. In addition, because many cellular base stations have antennas arranged for maximum gain in the horizontal direction, establishing significant signal strength from any base station while in-flight may be difficult despite a clear line-of-sight to several base stations.

Many airlines provide in-flight phone systems for their passengers. The existing in-flight phone systems, however, only have one-way or outgoing call capability. While passengers can place a call to any telephone number, calls cannot be automatically received during the flight. Thus, there remains a need for a telecommunications system which extends wireless services to users globally including while on-board an aircraft.

BRIEF DESCRIPTION OF DRAWINGS

For a more complete understanding of this invention, reference should now be had to the embodiments illustrated in greater detail in the accompanying drawings and described below by way of examples of the invention.

In the drawings.

DETAILED DESCRIPTION

Figure 1:
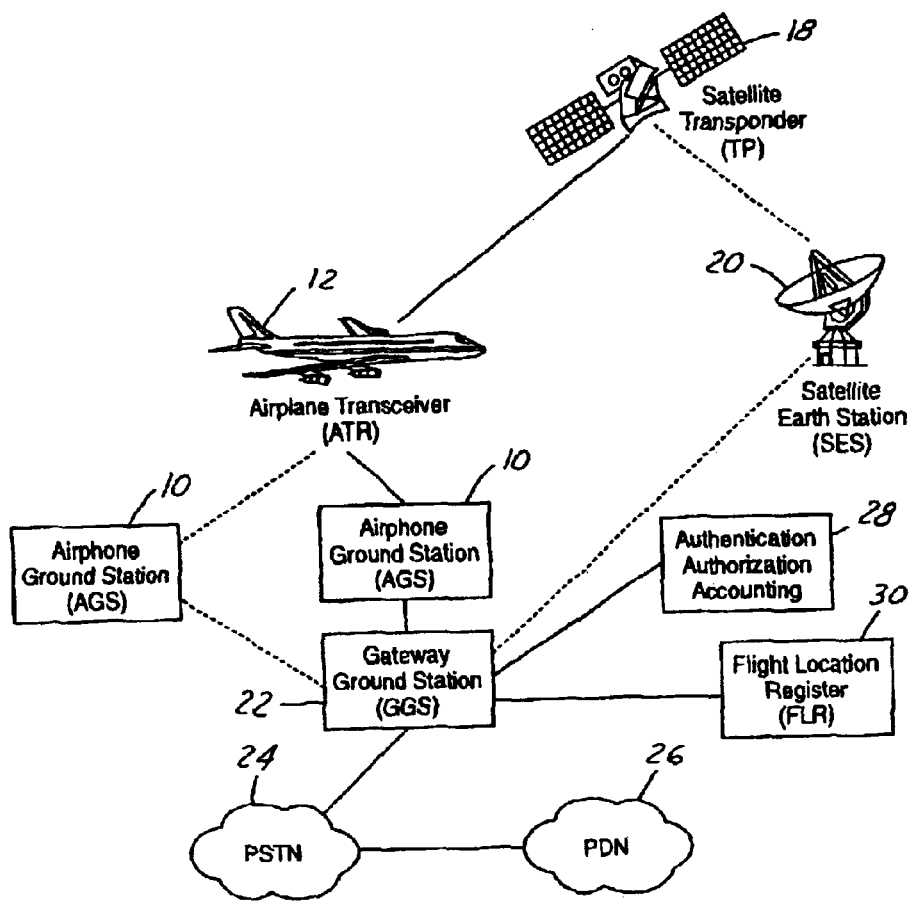
FIG. 1 is a schematic diagram of an example of an airline telephone system according to the prior art.

The present invention provides various system architectures for extending the roaming feature of a wireless telecommunications system, in a fully automated fashion to all subscribers globally, including while on-board an airplane. In one example, a system for extending a user's communications services to an airplane seat telephone terminal proximate the user while the user is aboard an airplane is provided. The system includes a Subscriber Interface (SI) for providing a Subscriber Identity Record (SIR) including the user's flight data and a Universal Communications Address (UCA), and a Subscriber Location Register (SLR) adapted to receive the Subscriber Identity Record from the Subscriber Interface and communicate with a Home Location Register (HLR) associated with the user to provide a subscriber location in response to a telephone call placed to the user's Universal Communications Address. The universal communications address can be a MSISDN number associated with a cellular mobile user terminal or an ISDN/PSTN number associated with a wireline telephone of said user.

In another example, a method for extending a user's communications services to an airplane seat telephone terminal proximate the user while the user is aboard an airplane is provided. The method includes providing a Subscriber Identity Record including the user's flight data and a Universal Communications Address to a Subscriber Location Register connected to a Home Location Register associated with the user's communications services and, in response to a telephone call placed to the user's Universal Communications Address, routing the telephone call to the airplane seat telephone terminal aboard the airplane as a function of the Subscriber Identity Record.

In another example, a method for extending a user's wireless communications services associated with a mobile terminal to a user-selected telephone at a location is provided. The method includes providing a Subscriber Identity Record including a user mobile services MSISDN number and a Universal Communications Address to a Subscriber Location Register connected to a Home Location Register associated with the user's wireless communications services and, in response to a telephone call placed to the user's Universal Communications Address, routing the telephone call to the user-selected telephone as a function of the Subscriber Identity Record.

An advantage of the present system is that it provides for an efficient and fully automated method and system for readily contacting a person on-board a flight by dialing the user's already known wireless telephone number. While the present invention is described with respect to a method and system for extending wireless services to aircraft while in the air, the present invention may be adapted and utilized for residential or business environments as well. In these cases, a subscriber at their residential or business unit where, for example, wireless services may be inadequate or service charges associated with that location are desired to be avoided or minimized, can be automatically recognized to be at their residence or business location, and receive calls made to their wireless telephone number at their residential or business wireline telephone instead.

With regard to the in-flight extension of wireless services to a subscriber, the system described herein allows a subscriber, while on-board an airplane anywhere around the world, to receive calls which are made to the subscriber's cellular wireless telephone. The subscriber on the airplane is simply reached by dialing the subscriber's cellular telephone number which the system recognizes as the Universal Communications Address associated with the particular subscriber. The present system and architecture can also be adapted to connect calls to a subscriber which are received during a flight when the subscriber's residential or business landline telephone number is dialed instead of the subscriber's cellular wireless telephone number. In such cases, the subscriber's residence or business telephone number correlates to the Universal Communications Address associated with the subscriber.

Accordingly, as directed by the subscriber, the present system routes telephone calls made to the subscriber's Universal Communications Address number, which may be the subscriber's cellular, business, residential telephone number, to the phone located at the subscriber's seat on an airplane or the telephone at the subscriber's business or residential location, respectively.

In the following description, various operating parameters and components are described for one constructed embodiment. These specific parameters and components are included as examples and are not meant to be limiting.

Referring now to the drawings wherein like reference numerals are used to identify identical components in the various views, FIG. 1 illustrates a schematic diagram of an example of a current airline telephone system. In current airphone systems, the airplane 12 is equipped with a plurality of Airplane Seat Phones (ASP) each associated with a particular airplane seat or group of seats. The airplane seat phones provide the user with a keypad, microphone, and earphone to allow the user to make telephone calls, and also typically include a card reader to allow the user to access the airphone network by inputting (swiping) a credit card or a calling card. The calls placed on the airplane seat phone are transmitted by the Airplane Transceiver (ATR) 16 to one or more Airphone Ground Stations (AGS) 10 located throughout the area over which the airplane 12 is traveling or, outside the coverage area provided by the Airphone Ground Station 10, to a satellite transponder 18. Signals from the satellite transponder 18 are routed to a Satellite Earth Station (SES) 20 and further to a Gateway Ground Station (GGS) 22. Similarly, signals transmitted to an airphone ground station 10 are communicated to the gateway ground station 22. Signals transmitted to the gateway ground station 22 are then forwarded to an end-user's destination such as the Public Switched Telephone Network (PSTN) 24 or the public Packet Data Network (PDN) 26. The gateway ground station 22 is also in communication with other databases such as databases for authentication, authorization, and accounting 28 and a Flight Location Register (FLR) 30 which stores identification details for the aircraft 12 currently served by the gateway ground station 22. When the aircraft 12 passes into the control of a different gateway ground station or the satellite system, the Flight Location Register 30 will keep track of the current ground station serving the aircraft 12 as well as the arrival status and any delay or re-routing information on the aircraft 12.

In existing airline telephone systems, a user cannot receive telephone calls unless the caller knows the signaling code for the airplane seat phone associated with the user. Further, the caller may also need to know the identification data associated with the gateway ground station serving the airplane 12 at the time of calling, which gateway ground system may require pre-authorization to serve the incoming call to the passenger on-board the airplane 12.

The present invention augments the generic airline telephone system just described and provides a Global Roaming System (GRS) 32 for automatically extending land-based mobile network wireless services to a subscriber in-flight aboard an aircraft.

Figure 2:
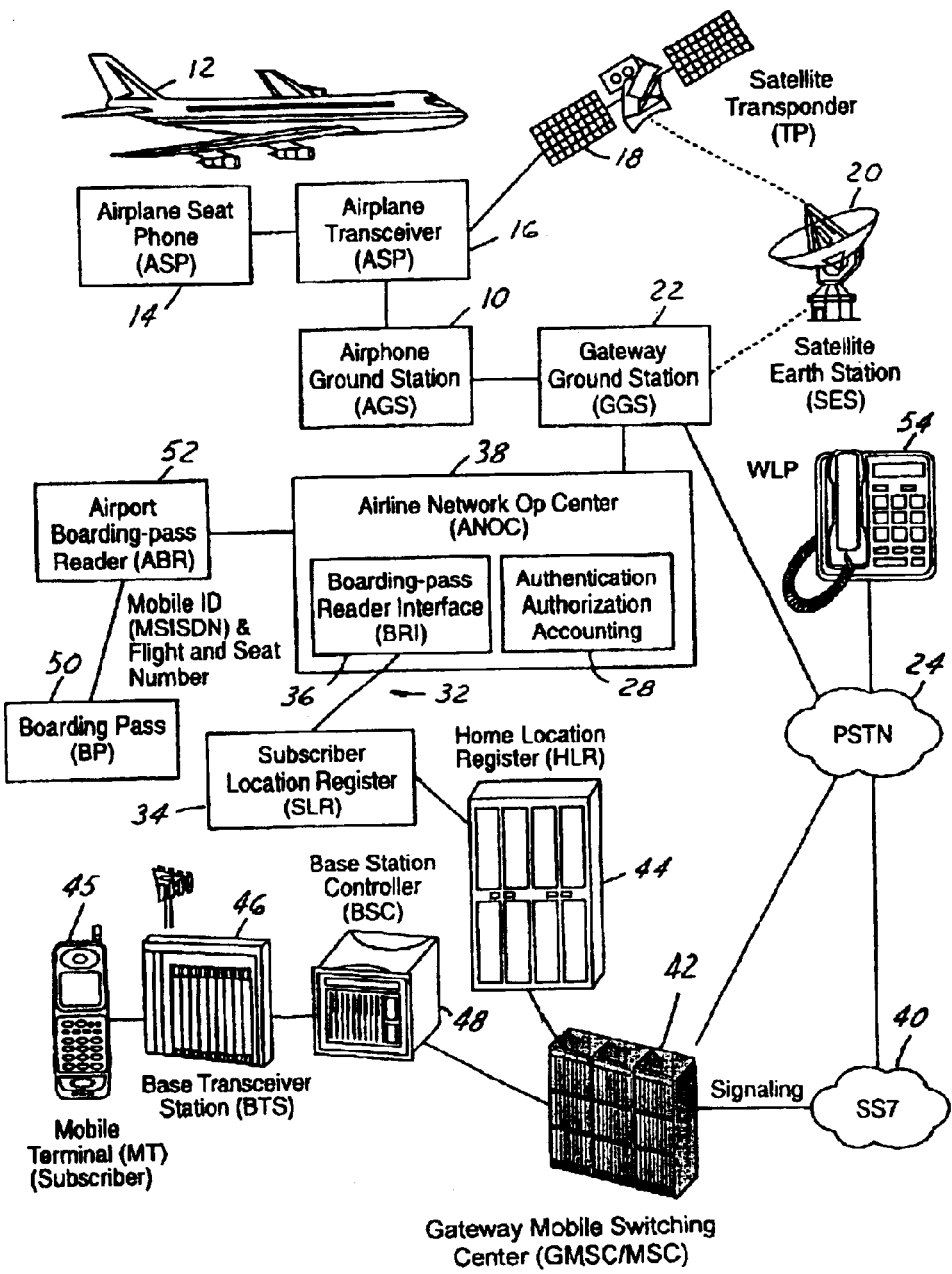
FIG. 2 is a schematic diagram of a global roaming service system architecture according to one embodiment of the present invention.

Referring now to FIG. 2, there is shown a schematic diagram of a Global Roaming System architecture according to one embodiment of the present invention.

The Global Roaming System 32 includes a Subscriber Location Register (SLR) 34 and a subscriber interface such as a Boarding-Pass Reader Interface (BRI) 36, and associated traffic and signaling links between the Subscriber Location Register 34 and Boarding-Pass Reader Interface 36 units and the Airline Network Operations Center (ANOC) 38. The Global Roaming System 32 of FIG. 2 is shown implemented within a Global System for Mobile Communications (GSM)-based network architecture. Nevertheless, the present invention contemplates, and one of skill in the art would understand, that the Global Roaming System 32 of the present invention can be readily adapted for use in other cellular telephone system architectures. GSM operations use worldwide SS7 networks 40 (the signaling and supervisory network built for wireline telecommunications systems) to provide real-time pre-call authentication and validation for outgoing calls and roaming-subscriber location determination for incoming calls. To facilitate roaming and local GSM operations, every Gateway Mobile Switching Center (GMSC) 42 is associated with, among other things, a Home Location Register (HLR) 44. The term "roaming" describes a mobile customer's ability to use mobile telephone services outside the home service area of the operator with which the customer established mobile service.

Other components (not shown) within the network subsystem comprising the Gateway Mobile Switching Center 42 and HRL 44 may include an Authentication Center (AUC), Interworking Location Register (ILR), Equipment Identity Register (EIR), and a Visitor Location Register (VLR). The Equipment Identity Register, for example, is a database that contains electronic serial numbers each of which is assigned by a manufacturer to uniquely identify a particular Mobile Terminal (MT) 45.

The radio subsystem side of the network includes the Mobile Terminals 45 of the subscriber's, a plurality of Base Transceiver Stations (BTS) 46, and one or more Base Station Controllers (BSC) 48.

In the embodiments shown in FIG. 2, the Subscriber Location Register 34 is co-located at the site of the Home Location Register 44, and the Boarding-Pass Reader Interface 36 is co-located at the site of the Airline Network Operations Center 38. The Subscriber Location Register 34 is a database similar in function to a Home Location Register 44. The Home Location Register 44 is a database of subscriber information for each Mobile Terminal 45. The Subscriber Location Register 34 supplements the subscriber data contained within the Home Location Register 44 and includes a Subscriber Identity Record (SIR) which includes the subscriber's Universal Communications Address (UCA) which, in this case, is the Global Roaming System subscriber's mobile telephone number (MSISDN number), the flight number and the seat number. The Subscriber Location Register 44 communicates with the Home Location Register 44 which is a common component of the public land mobile network to supply the Subscriber Identity Record containing the Global Roaming System subscriber mobile telephone number, flight number, and seat number to the Home Location Register 44. The Home Location Register 44, in turn, provides the subscriber data to the Gateway Mobile Switching Center 42 when queried for the location of the subscriber in response to a telephone call placed to the Global Roaming System subscriber's Universal Communications Address, which, in this example, is the subscriber's mobile telephone number.

The Subscriber Identity Record information is communicated to the Subscriber Location Register 34 by the subscriber interface 36. The Subscriber Identity Record data in the example of FIG. 2 is acquired by the Boarding-Pass Reader Interface 36. The Boarding-Pass Reader Interface 36 acquires the Global Roaming System subscriber's cellular telephone number from the subscriber's boarding pass (BP) 50 at the time it is read by the Airport Boarding-Pass Reader (ABR) 52. Thus, the Global Roaming System subscriber's Mobile Services ISDN (MSISDN) number, flight number, and seat number, which are recorded on the magnetic strip portion of the boarding pass 52 are forwarded to the Subscriber Location Register 34 by way of the Boarding-Pass Reader Interface 36. Communications between the Airport Boarding-Pass Reader 52 and Airline Network Operations Center 38 are accomplished by known methods using existing data links and prevailing standards for airline telephone networks. The communications between the Subscriber Location Register 34 and the Boarding-Pass Reader Interface 36 can be accomplished through the connections between the Gateway Mobile Switching Center 42 and the Airline Network Operations Center 38 to a public packet data network such as the Internet, or alternatively through dedicated data links.

In operation, a Mobile Terminal user who has subscribed to the Global Roaming System services can have their calls terminated at the Airplane Seat Phone 14 available on the airplane 12 proximate the subscriber's assigned seat. The subscriber can choose to have all calls routed through the Global Roaming System automatically upon boarding the airplane 12, or can select rerouting on a flight-by-flight basis to be specified at the time that a boarding pass is issued. The Global Roaming System services is enabled by entering the subscriber's desired Universal Communication Address, such as the subscriber's cellular phone MSISDN number on the subscriber's flight boarding pass 50. The absence of the Universal Communications Address (blank or zeroed fields) indicates the unavailability or disabling of the Global Roaming System service for that particular flight. In such cases, the Boarding-Pass Reader Interface 36 will not send any data for the passenger to the Subscriber Location Register 34, if the Global Roaming System service is not enabled.

Otherwise, the Subscriber Identity Record which includes the subscriber's MSISDN number, flight number and seat number, recorded on the magnetic strip portion of the boarding pass is read by the Airport Boarding-Pass Reader 52 and forwarded to the Subscriber Location Register 34 through the Boarding-Pass Reader Interface 36. The Subscriber Location Register 34 communicates with the Home Location Register 44 to supply the Subscriber Identity Record to the Home Location Register 44. When a call is placed to the subscriber's MSISDN number (i.e. the cellular phone), the Home Location Register provides the current location information associated with the Subscriber Identity Record to the Gateway Mobile Switching Center 42. Based upon the information obtained from the Home Location Register 44, the Gateway Mobile Switching Center 42 routes the telephone call to the subscriber, along with the Subscriber Identity Record, through the appropriate Gateway Ground Station 22. Using the Subscriber Identity Record data, the Gateway Ground Station 22 connects the call, through the Airphone Ground Station 10 serving the airplane 12 at the time, to the Airplane Seat Phone 14 associated with the subscriber's seat on the flight specified by the Subscriber Identity Record. The MSISDN number supplied to the Gateway Ground Station 22 is used to create the billing records for the subscriber.

Upon arrival of the airplane 12 at the desired destination, the Boarding-Pass Reader Interface 36 communicates to the Subscriber Location Register 34 that the flight is terminated. The Subscriber Location Register 34, in turn, communicates with the Home Location Register 44 to disable the Global Roaming System service. In addition, the Subscriber Location Register can register the subscriber for regular roaming services at the mobile system associated with the flight destination location. The Global Roaming System subscriber's preference for roaming in any or none of the mobile systems at the destination location would be available from the subscriber's profile stored at the Home Location Register 44.

Besides the flight arriving at its destination, the system also provides for the capability of activating and deactivating the Global Roaming System services after the subscriber has boarded the plane 12. In such cases, the subscriber can input a command through the airplane seat phone 14 to terminate Global Roaming System services. The decision to terminate Global Roaming System services is communicated to the Subscriber Location Register by way of the Boarding-Pass Reader Interface 36 communicating with the Airline Network Operations Center 38 and Gateway Ground Station 22 associated with the airplane 12. Activate or deactivate commands can be entered, for example, through the keypad or card-reader associated with the airplane seat phone.

Figure 3A:
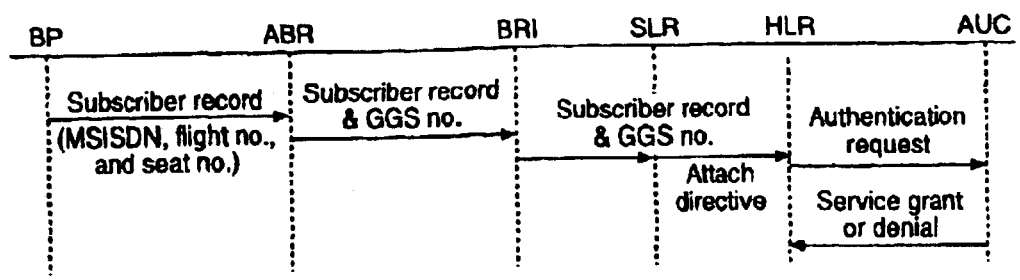
FIGS. 3A–3C show message sequencing charts for the global roaming service system of FIG. 2.
Figure 3B:
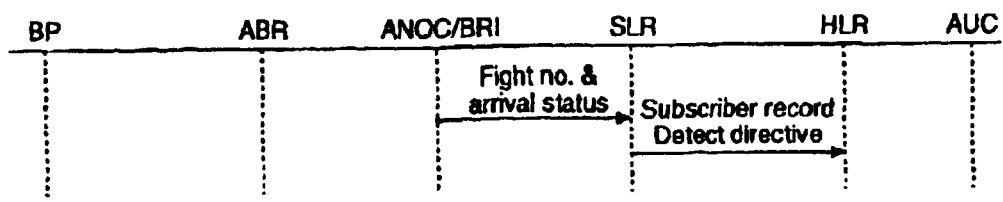
Figure 3C:
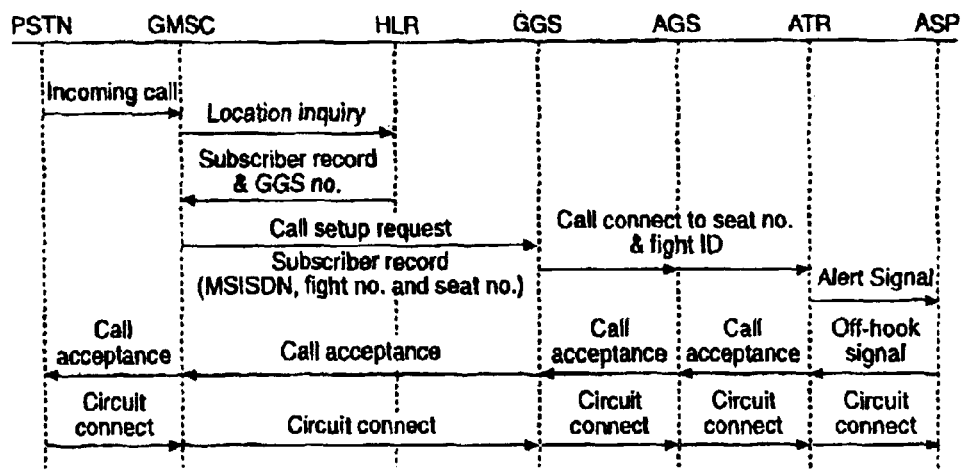

FIGS. 3A–3C show message sequencing charts for the Global Roaming System of FIG. 2. In particular, FIG. 3A shows the Global Roaming System subscriber registration and authentication sequence. The sequence starts with the Subscriber Identity Record (SIR) being acquired from the subscriber's boarding pass by the Airport Boarding-Pass Reader (ABR). The information such as the Mobile Services ISDN number, flight number, and seat number of the subscriber is then transmitted from the Airport Boarding-Pass Reader to the Boarding-Pass Reader Interface 36. The Gateway Ground Station 22 associated with the flight may also be included and communicated to the Boarding-Pass Reader Interface 36. The Boarding-Pass Reader Interface 36 communicates the subscriber identity record to the Subscriber Location Register 34 along with the Gateway Ground Station data to the Home Location Register 44. The Home Location Register 44 sends an authentication request to the Authentication Center (AUC) which either indicates that the Global Roaming System service to the subscriber is granted or denied.

FIG. 3B shows the message sequencing for Global Roaming System subscriber de-registration (detach). When the flight arrives at its destination, the Airline Network Operations Center 38 through the Boarding-Pass Reader Interface 36 communicates to the Subscriber Location Register 34 that the subscriber has arrived at a destination. The Subscriber Location Register, in turn, communicates a detach directive to the Home Location Register 34 to terminate the Global Roaming System call-forwarding service. A subscriber-initiated deregistration would operate in a similar manner, but would be initiated by the subscriber at the airplane seat phone with a request to detach from the subscribed service.

FIG. 3C shows the message sequencing for a call initiated from, for example, a Wireline Phone (WLP) 54 to the subscriber's cellular telephone number while the subscriber is in-flight. The wireline phone 54, through the Public Switched Telephone Network (PSTN) 24, communicates to the Gateway Mobile Switching Center 42 of a desire to connect to the Mobile Terminal subscriber. The Gateway Mobile Switching Center 42 makes a location inquiry with the Home Location Register 44 which, in response, forwards the Subscriber Identity Record and Gateway Ground Station data to the Gateway Mobile Switching Center 42. The Gateway Mobile Switching Center 42 then initiates a call setup request through the appropriate Gateway Ground Station 22. The Gateway Ground Station 22 attempts to connect the call by way of the Airphone Ground Station 10 and Airplane Transceiver 16 to the Airplane Seat Phone 14 corresponding to the subscriber's seat and flight information. In response to the alert signal at the subscriber's Airplane Seat Phone 14, the subscriber takes the call and establishes a circuit connection with the caller.

In an alternate embodiment, the Subscriber Identity Record data can be acquired from the subscriber at the Airplane Seat Phone 14 through the card-reader associated with the Airplane Seat Phone 14. In such cases, the user can carry a Global Roaming System "calling card" which can be read by the card reader associated with the subscriber's Airplane Seat Phone to provide the Subscriber Identity Record data to the subscriber interface 36 and, subsequently, the Subscriber Location Register 34. Thus, instead of the subscriber's boarding pass being coded with the desired Universal Communication Address to associate the subscriber's airplane seat phone with the wireless network, the subscriber's calling card can contain the same information. Data regarding the identity of the airplane seat phone associated with the subscriber, the flight number and other pertinent flight data including the Gateway Ground Station numbers associated with the flight are all gathered from the existing airline telephone system network data. In this way, the Global Roaming System subscriber would not be committed to having to sit in the seat indicated on their boarding pass if, for some reason, the subscriber had the option to sit in an unassigned seat. In such situations, the message sequence chart for subscriber registration and authentication would be similar to that shown in FIG. 3A but would differ in that the subscriber identity record and Gateway Ground Station number would originate from the card reader or keypad associated with the Airplane Seat Phone on the airplane rather than the boarding pass.

Figure 4:
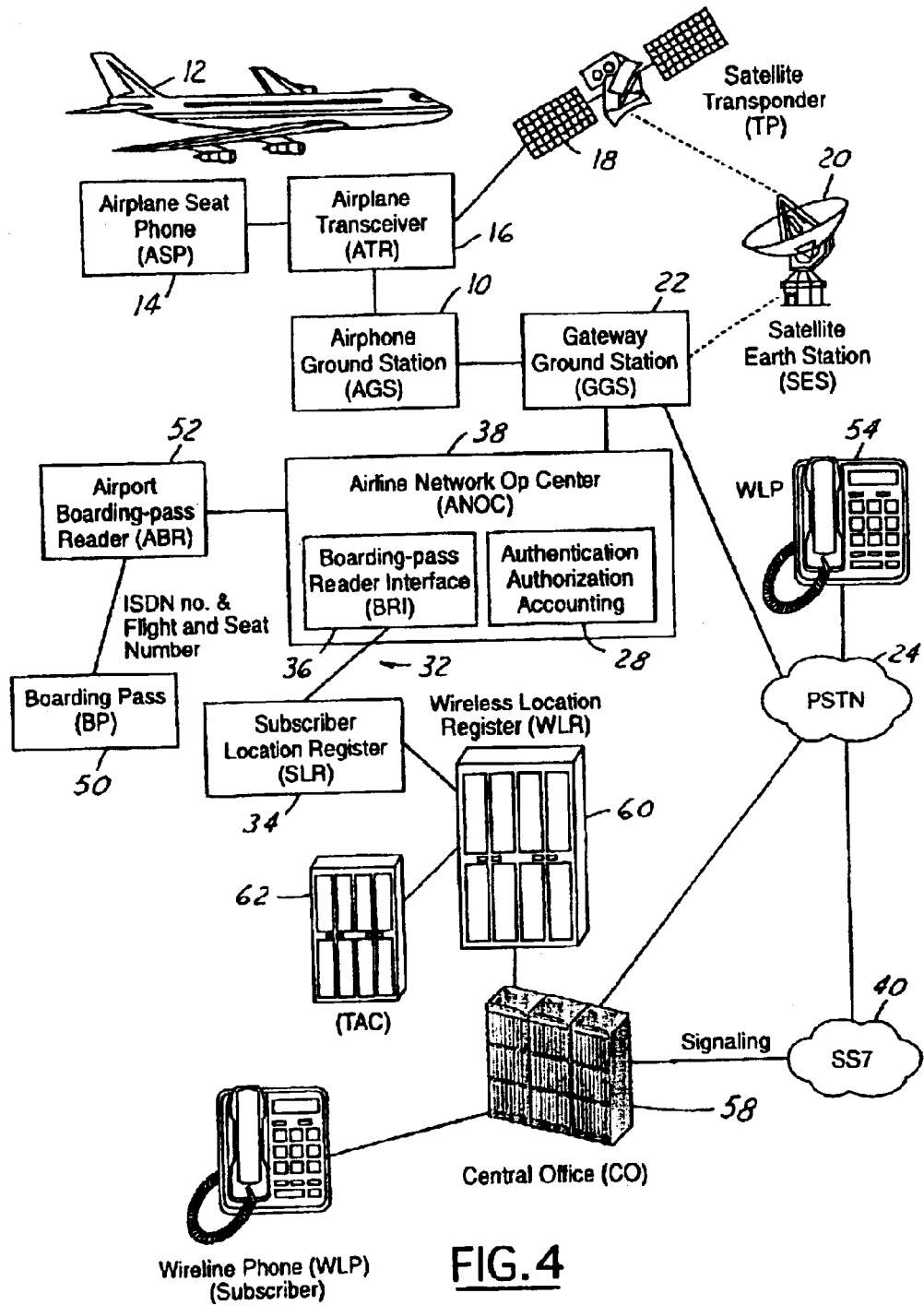
FIG. 4 shows a schematic diagram of a global roaming service system architecture for a wireline application according to one embodiment of the present invention.

Referring now to FIG. 4, there is shown a schematic diagram of a Global Roaming System architecture wireline application according to one embodiment of the present invention. The system architecture shown at FIG. 4 is similar to that shown in FIG. 2 except that the Global Roaming System 32 is shown as interfacing with one example of a wireline telephone system rather than a wireless telephone system. In the embodiment of FIG. 4, telephone calls made, for example, from Wireline Phone 54 to a subscriber's wireline phone 56 while the Global Roaming System subscriber was in-flight aboard airplane 12, would be routed to the airplane seat phone 14 associated with the subscriber. In this case, the Central Office (CO) 58 would route calls to the subscriber's wireline phone 56 in accordance with the data stored at a wireline operation equivalent of the HRL which is shown as the Wireline Location Register (WLR) 60. In the wireline application shown in FIG. 4, the Subscriber Identity Record would include the subscriber's ISDN/PSTN number instead of the Mobile Station ISDN (MSISDN) number as the desired Universal Communication Address to associate with the subscriber's airplane seat phone. Once a subscriber is registered and authenticated by the Telco Authentication Center (TAC) 62, a Central Office 58 serving an incoming call to the subscriber's ISDN/PSTN number, would first check its associated Wireline Location Register 60 to find the routing information for the destination ISDN/PSTN number. If a Global Roaming System attachment was indicated and provided by the Subscriber Location Register 34, the incoming call would be routed to the Gateway Ground Station 22 number obtained from the Wireline Location Register 60 by way of the Subscriber Location Register 34 for the destination ISDN/PSTN number. Otherwise, the registration and deregistration processes would follow the same steps as in the case with the wireless network shown in FIGS. 2 and 3.

Figure 5A:
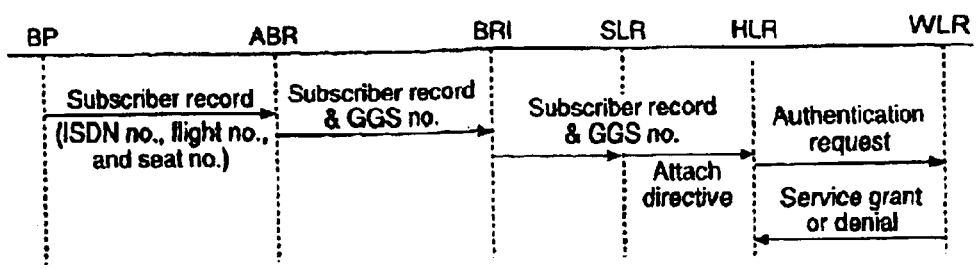
FIGS. 5A–5C show message sequencing charts for the global roaming service system of FIG. 4.
Figure 5B:
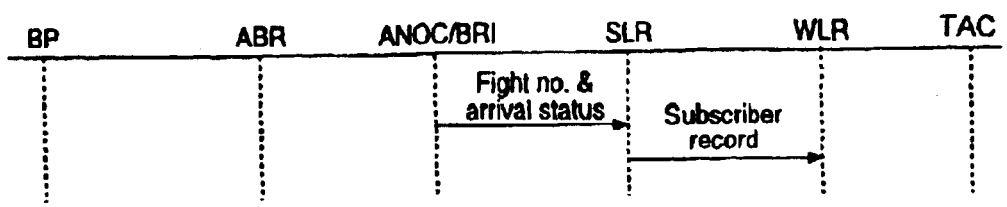
Figure 5C:
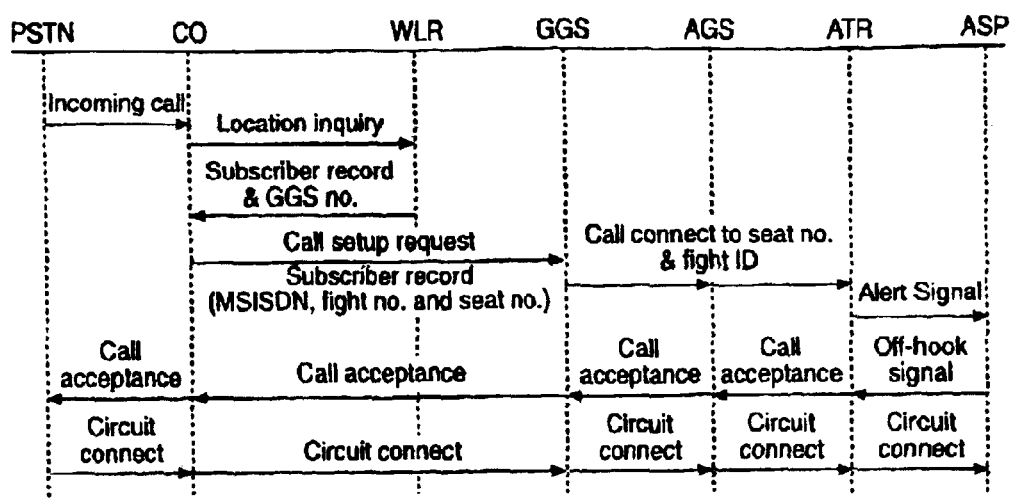

FIGS. 5A–5C show wireline message sequencing charts for the Global Roaming System of FIG. 4. In particular, FIG. 5A shows the subscriber registration and authentication message sequence chart for the wireline system of FIG. 4. Thus, the subscriber identity record as provided from the subscriber's boarding pass by way of the Airport Boarding-Pass Reader 52 and Boarding-Pass Reader Interface 36 is communicated to the Subscriber Location Register 34 along with the Gateway Ground Station numbers associated for the flight. The Subscriber Location Register communicates the Subscriber Identity Record and Gateway Ground Station flight data to the wireline register which, in turn, validates or denies the subscriber's service request with the Teleco Authentication Center 62. As mentioned above, the Global Roaming System service request could also be initiated by the subscriber at the subscriber's Airplane Seat Phone 14 on the airplane 12 through the use of the keypad, or a calling card and the card-reader associated with the Airplane Seat Phone 14.

FIG. 5B shows a subscriber deregistration message sequencing chart similar to that of FIG. 3B. In this example, the flight number and arrival status communicated from the Boarding-Pass Reader Interface 36 to the Subscriber Location Register 34 results in a detach directive being communicated to the wireline register 60. Alternatively, or in addition, the present invention contemplates that a detach directive can be initiated by the subscriber through the subscriber's Airplane Seat Phone while in-flight as well.

FIG. 5C is similar to the message sequencing chart of FIG. 3C with the exception that the incoming call to the subscriber's Wireline Phone 56 is handled by the Central Office 58 which makes a location inquiry of the wireline register 60. The wireline register 60 provides the Subscriber Identity Record and Gateway Ground Station data to the Central Office for completing the call setup request through the appropriate Gateway Ground Station.

Figure 6:
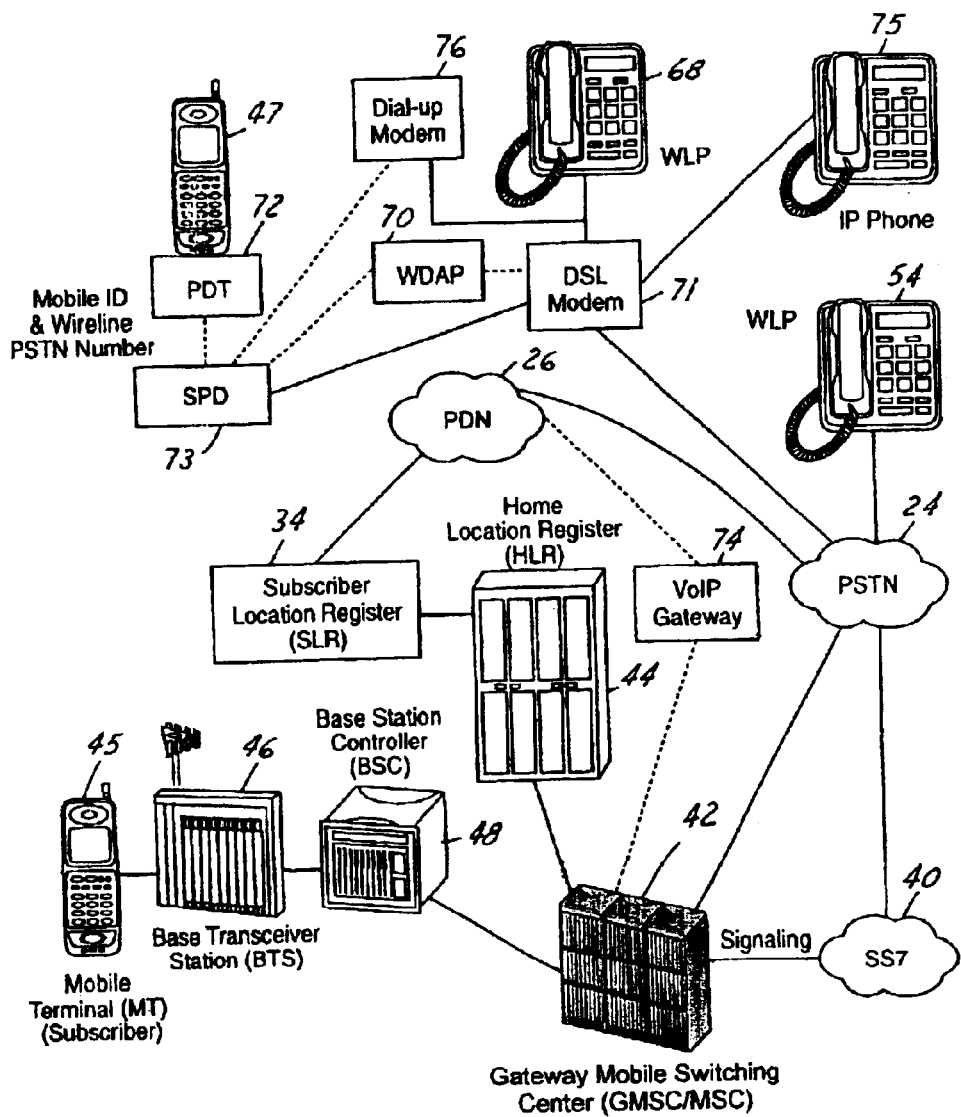
FIG. 6 shows a schematic diagram of a global roaming service system architecture for a residential/business application according to one embodiment of the present invention.

Referring now to FIG. 6 there is shown a schematic diagram of another embodiment of the Global Roaming System architecture where instead of calls being received at the airplane seat, calls made to a subscriber's mobile cellular phone are received automatically at the subscriber's residential or business wireline phone. In this embodiment, the subscriber's presence at the business or residence is detected (instead of by the airport Boarding-Pass Reader) by a Subscriber Presence Detector (SPD) 73 which is a wireless receiver with connection to the public packet data network PDN 26 through a DSL modem 71, or a cable modem, or a dial-up modem 76. The SPD 73 connection to the DSL modem 71 could be wired, or wireless thorough a wireless LAN access point such as WDAP 70. Telephone calls made to a subscriber's Mobile Terminal 45 are then routed automatically to a designated wireline phone 68 which, for example, can be located at a business or residence. The Public Land Mobile Network portion of FIG. 6, for ease of reference, is the same as that shown in FIG. 2. To that extent, reference should be made to FIG. 2 for the various component descriptions. In this embodiment, however, the airplane seat phone and associated airline telephone network have been replaced by a designated subscriber wireline (business or residential) phone 68 to which calls made to the subscriber's Mobile Terminal 45 are desired to be automatically forwarded.

In one embodiment of the invention, the subscriber's presence is detected through a Personal Data Transmitter (PDT) 72 which is a match-box size device carried by the subscriber, and possibly as an attachment to or as an integrated part of her/his cellular phone. When activated (e.g. turned-on), the Personal Data Transmitter PDT 72 continually transmits at certain intervals the subscriber data such as the authentication information, the MSISDN and ISDN/PSTN numbers, and the subscriber's preferences and service profile data. The PDT 72 transmission would be on an unlicensed frequency band compatible with the SPD 73 receiver capability. When the SPD 73 can receive and verify the subscriber's authenticity and the subscriber's preference for GRS activation, then the subscriber's presence is considered as detected. The Subscriber Presence Detector 73 then sends the subscriber identity record to the Subscriber Location Register 34 which in turn notifies the Home Location Register 44 of the subscriber's new status. This messaging is communicated to the Subscriber Location Register 34 through a public Packet Data Network 26 such as the Internet. The access to the PDN 26 could be through a direct wired connection between the SPD 73 and the DSL modem 71, or could be through a wireless Data Access Point 70 connection to the DSL modem 71. Using the ISDN/PSTN number provided by the Subscriber Location Register 34 to the Home Location Register 44, the Gateway Mobile Switching Center 42 routes incoming calls destined for the subscriber's mobile terminal number (the MSISDN number), through the PSTN 24 to the subscriber-designated wireline telephone 68 (which could be a corded or cordless phone).

Alternatively, the Gateway Mobile Switching Center 42 can transmit the incoming call through a public Packet Data Network 26 such as the Internet, after packetizing the voice at the Voice over Internet Protocol (VoIP) Gateway 74 of the Gateway Mobile Switching Center 42. In such a case, the call would be delivered to the subscriber not on a conventional PSTN wireline phone, but through a public packet data network 26 such as the Internet and a corded or cordless IP phone enabled to receive VoIP packetized voice through a DSL modem 71 (or alternatively a cable modem). The cordless IP phone could work through a wireless LAN access point such as the WDAP 70. With Cordless Telephony Profile such cordless phones could be integrated with cellular mobile handsets which would conveniently allow the subscriber to use the same handset in the system of FIG. 6. Thus, the subscriber could use the cellular handset as a cellular mobile telephone in the public land mobile network, and as a cordless phone in the non-public residential or business environments, to make and receive both cellular as well as wireline system calls.

In one embodiment, the Personal Data Transmitter PDT 72 transmits on an unlicensed frequency band the pre-stored subscriber data to indicate the presence of a subscriber. This transmitted signal is received by the SPD 73 whenever the subscriber is in the range of the reception of the SPD 73. The extent of the reception range of the SPD 73 can be controlled by adjusting the transmit power of the PDT 72 (with reference to the Federal Communications Commission's allowable emission limits) as well as by adjusting the receiver sensitivity of the SPD 73. In response to the subscriber detection, the Subscriber Presence Detector 73 will then initiate the registration process with the Subscriber Location Register 34 in the same manner as previously described. The Subscriber-Presence Detector 73 can be connected to the public Packet Data Network 26 directly with a DSL modem 71 or a cable modem connection, or wirelessly through the Wireless Data Access Point WDAP 70 which in turn would be connected to the same DSL modem 71 or a cable modem. Alternatively the Subscriber Presence Detector 73 could be connected to the Packet data Network PDN 26 through a dial-up modem 76. This can be particularly advantageous in situations where broadband connections such as DSL or cable are not yet available or established, thus extending the range of applications of this invention to even a greater market area.

In another embodiment, the SPD 73 would include a cellular radio receiver adapted to detect the subscriber's presence by recognizing the subscriber through the reception of the subscriber's mobile system identifying data which is transmitted by the subscriber's handset to the base station on the cellular control channel, for example, when the cellular telephone is powered off. The range for this presence detection can be adjusted through the SPD 73 receiver settings for various handset data transmissions that are used for subscriber recognition.

Figure 7A:
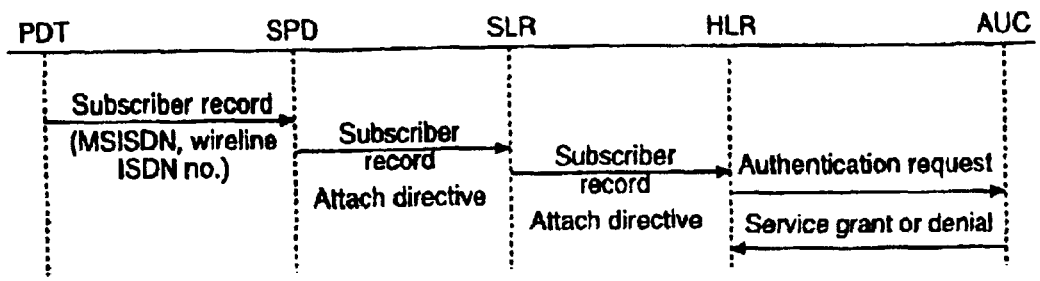
FIGS. 7A–7D show message sequencing charts for the global roaming service system of FIG. 6.

Referring now to FIGS. 7A–7D, there are shown message sequencing charts for the Global Roaming System architecture of FIG. 6. FIG. 7A shows the subscriber registration and authentication messaging sequence when a subscriber's presence is detected by the Subscriber Presence Detector 73 through the Personal Data Transmitter 72. In such a case, the subscriber identity record including the MSISDN and destination wireline number is transmitted from the PDT 72 to the Subscriber Location Register 34 which sends an attach directive to the Home Location Register 44, which in turn will check the validity of the subscriber with the authentication center.

Figure 7B:
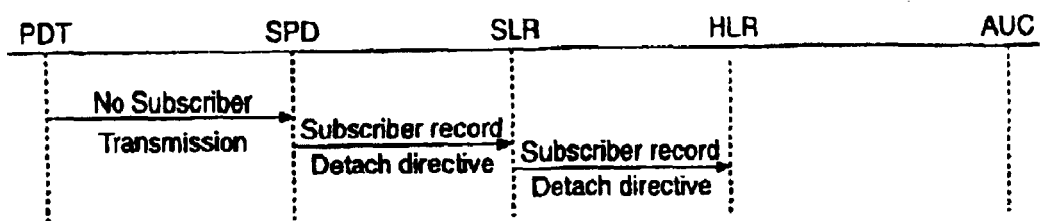

FIG. 7B shows the subscriber deregistration process wherein the subscriber is not detected by the SPD 73. In this case, a detach directive is communicated from the SPD 73 to the Subscriber Location Register 34 and, subsequently to the Home Location Register 44.

Figure 7C:
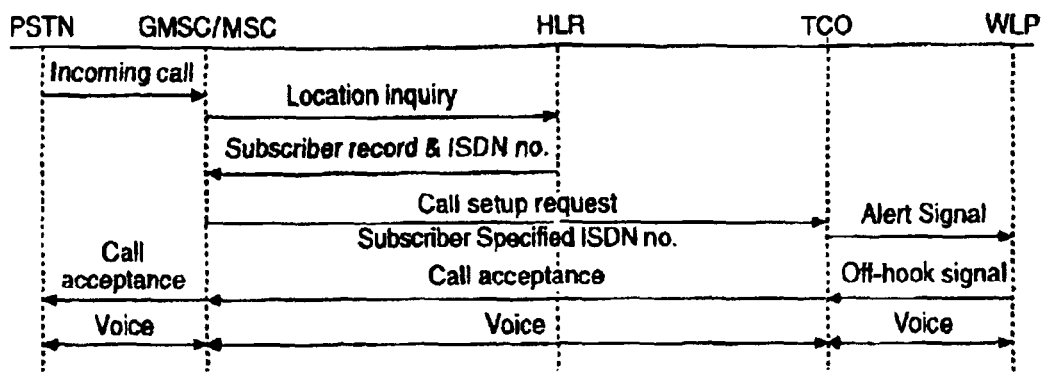

FIG. 7C shows one example of a call placed through the Public Switched Telephone Network 24 by, for example, wireline phone 54 to the Mobile Terminal 45 of the subscriber. In this example, the incoming call is communicated to the Gateway Mobile Switching Center 42 which makes the location inquiry of the Home Location Register 44 and receives, in response, the Subscriber Identity Record and wireline phone ISDN/PSTN number if the subscriber desires to have calls forwarded. The call setup request is then processed according to the subscriber's specified ISDN/PSTN number. The call request can then be processed through the telco central office to ring through the subscriber's specified wireline phone 68.

Figure 7D:
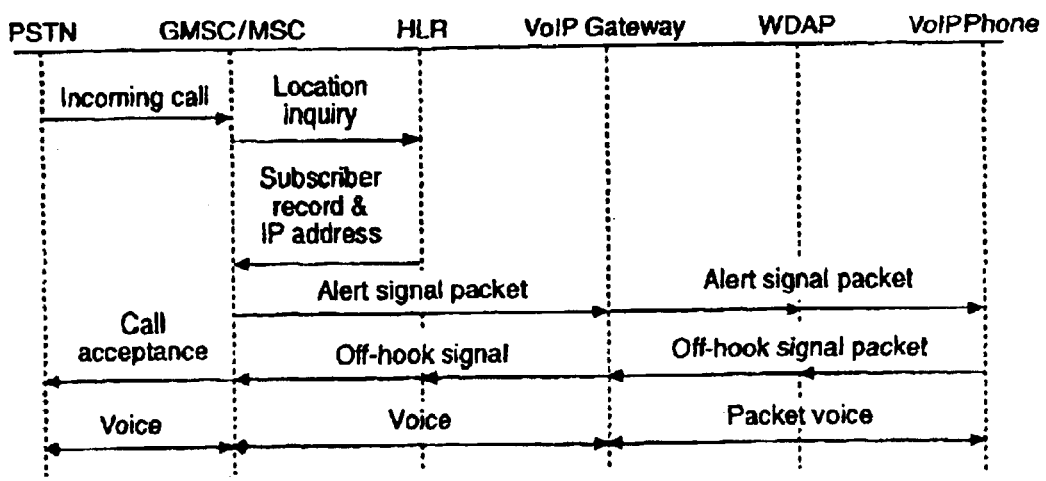

FIG. 7D shows an alternative scenario wherein the subscriber's Mobile Terminal is a wireless LAN-enabled cellular phone 47 capable of receiving Voiceover IP packets. In this scenario, the incoming call to the mobile terminal placed through the PSTN 24 is processed by the Gateway Mobile Switching Center 42 and a location inquiry is made of the Home Location Register 44. In response, the Subscriber Identity Record and IP address of the subscriber is communicated back to the Gateway Mobile Switching Center 42. An alert signal packet is then transmitted from the Gateway Mobile Switching Center 42 through the Voice over IP gateway 74 and subsequent public packet data network 26. The off-hook signaling then proceeds as shown in FIG. 7D through the gateway 74.

From the foregoing, it can be seen that there has been brought to the art a new and improved global roaming system which has advantages over prior telecommunications systems. While the invention has been described in connection with one or more embodiments, it should be understood that the invention is not limited to those embodiments. On the contrary, the invention covers all alternatives, modifications and equivalents as may be included within the scope and spirit of the appended claims.

What is claimed is:

1. A system for extending a user's communications services to an airplane seat telephone terminal proximate the user while aboard an airplane comprising:
   a Subscriber Interface (SI) for providing a Subscriber Identity Record (SIR) including said user's flight data and a Universal Communications Address (UCA): and
   a Subscriber Location Register (SLR) adapted to receive said subscriber identity record from said subscriber interface and communicate with a home location register associated with said user to provide a subscriber location in response to a telephone call placed to said user's universal communications address,
   wherein said subscriber Interface is a Boarding-Pass Reader Interface (BRI) associated with an airline network operations center.

2. A system according to claim 1 wherein said universal communications address is a Mobile Station ISDN (MSISDN) number associated with a mobile terminal of said user.

3. A system according to claim 1 wherein said universal communications address is an ISDN/PSTN number associated with a wireline phone of said user.

4. A system for extending a user's communications services to an airplane seat telephone terminal proximate the user while aboard an airplane comprising:
   a Subscriber Interface (SI) for providing a Subscriber Identiy Record (SIR) including said user's flight data and a Universal Communications Address (UCA); and
   a Subscriber Location Register (SLR) adapted to receive said subscriber identity record from said subscriber interface and communicate with a home location register associated with said user to provide a subscriber location in response to a telephone call placed to said user's universal communications address,
   wherein said subscriber interface is a keypad or card reader of said airplane seat telephone terminal.

5. A system for extending a user's communications services to an airplane seat telephone terminal proximate the user while aboard an airplane comprising:
   a Subscriber Interface (SI) for providing a Subscriber Identity Record (SIR) including said user's flight data and a Universal Communications Address (UCA); and
   a Subscriber Location Register (SIR) adapted to receive said subscriber identity record from said subscriber interface and communicate with a home location register associated with said user to provide a subscriber location in response to a telephone call placed to said user's universal communications address,
   wherein said subscriber identity record comprises a Mobile Station ISDN number, flight number, and seat location for said user.

6. A system for extending a user's communications services to an airplane seat telephone terminal proximate the user while aboard an airplane comprising:
   a Subscriber Interface (SI) for providing a Subscriber Identity Record (SIR) including said user's flight data and a Universal Communications Address (UCA); and
   a Subscriber Location Register (SLR) adapted to receive said subscriber identity record from said subscriber interface and communicate with a home location register associated with said user to provide a subscriber location in response to a telephone call placed to said user's universal communications address,
   wherein said subscriber identity record comprises an ISDN/PSTN number, flight number, and seat location for said user.

7. A system for extending a user's communications services to an airplane seat telephone terminal proximate the user while aboard an airplane comprising:
   a Subscriber Interface (SI) for providing a Subscriber Identity Record (SIR) including said user's flight data and a Universal Communications Address (UCA); and
   a Subsriber Location Register (SLR) adapted to receive said subscriber identity record from said subscriber interface and communicate with a home location register associated with said user to provide a subscriber location in response to a telephone call placed to said user's universal communications address,
   wherein said subscriber interface is adapted to transmit to said subscriber location register flight termination data to terminate communications from the subscriber location register to the Home Location Register.

8. A method for extending a user's communications services to an airplane seat telephone terminal proximate the user while aboard an airplane comprising:
   providing a subscriber identity record (SIR) including said user's flight data and a Universal Communications Address (UCA) to a Subscriber Location Register (SLR) connected to a home location register associated with said user's communications services;
   in response to a telephone call placed to said user's universal communications address, routing said telephone call to said airplane seat telephone terminal aboard said airplane as a function of said subscriber identity record; and
   comprising generating said subscriber identity record at a boarding pass reader, and communicating said subscriber identity record to said subscriber location register by a boarding pass reader interface associated with an airline network operating center.

9. A method according to claim 8 wherein said universal communications address is a Mobile Station ISDN (MSISDN) number associated with a mobile terminal of said user.

10. A method according to claim 8 wherein said universal communications address is an ISDN/PSTN number associated with a wireline phone of said user.

11. A method for extending a user's communications services to an airplane seat telephone terminal proximate the user while aboard an airplane comprising:
   providing a subscriber identity record (SIR) including said user's flight data and a Universal Communications Address (UCA) to a Subscriber Location Register (SLR) connected to a home location register associated with said user's communications services;
   in response to a telephone call placed to said user's universal communications address, routing said telephone call to said airplane seat telephone terminal aboard said airplane as a function of said subscriber identity record; and
   comprising generating said subscriber identity record at said airplane seat telephone terminal by a card swipe or keypad input from said user, and communicating said subscriber identity record to said subscriber location register by a boarding pass reader interface associated with an airline network operating center.

12. A method for extending a user's wireless communications services associated with a mobile terminal to a user-selected telephone at a location comprising:
   providing a Subscriber Identity Record (SIR) including a user Mobile Station ISDN number and a Universal Communications Address (UCA) to a Subscriber Location Register (SLR) connected to a home location register associated with said user's wireless communications services; and
   in response to a telephone call placed to said user's Universal Communications Address, routing said telephone call to said user-selected telephone as a function of said Subscriber Identity Record,
   wherein said user mobile terminal is a cellular telephone, and the step of routing comprises transmitting said telephone call through a Voice over IP (VoIP) gateway to said user mobile terminal.

13. A method according to claim 12 wherein said Subsriber Identity Record is provided in response to detecting at a Subscriber Presence Detector, a Personal Data Transmitter signal associated with said user.

14. A method according to claim 12 wherein the step of routing comprises transmitting a call setup request through a public switched telephone network to said user-selected telephone, and wherein said user-selected telephone is a wireline telephone.

15. A method according to claim 13 comprising terminating transmission of said Subscriber Identity Record to said Subscriber Location Register in response to said user's Personal Data Transmitter (PDT) being out of range or being turned-off in proximity of said Subscriber Presence Detector.

16. A method according to claim 12 wherein said universal communications address is a wireline ISDN/PSTN number.

17. A method according to claim 12 comprising providing a Subscriber Presence Detector (SPD) at said location, and wherein said Subscriber Identity Record is provided in response to said SPD detecting said user's cellular system data transmission occurring when said mobile terminal is switched off.

* * * * *